United States Patent [19]

Nashlund

[11] 4,306,823
[45] Dec. 22, 1981

[54] BORING AND ROUTING JIG FOR CYLINDRICAL DOOR KNOB ASSEMBLIES AND THE LIKE

[76] Inventor: John E. Nashlund, 1727 Juniper Dr., Edgewater, Fla. 32032

[21] Appl. No.: 96,700

[22] Filed: Nov. 23, 1979

[51] Int. Cl.³ .................... B23B 41/00; B23B 45/14; B23C 3/00
[52] U.S. Cl. .................... 408/26; 144/3 R; 144/144.5 GT; 408/108; 408/109; 408/115 R; 33/197
[58] Field of Search .................... 408/26, 95, 103, 104, 408/105, 108, 109, 115 R, 115 B; 144/3 R, 144.5; 29/26 A; 33/197

[56] References Cited

U.S. PATENT DOCUMENTS

| | | | |
|---|---|---|---|
| 1,210,942 | 1/1917 | Jones | 408/104 |
| 2,193,204 | 3/1940 | Nilson | 408/109 |
| 2,605,791 | 8/1952 | Zern | 408/105 X |
| 2,843,167 | 7/1958 | Rushton | 33/197 X |
| 3,211,026 | 10/1965 | Calahan | 408/103 |
| 3,327,573 | 6/1967 | Prussiano | 408/115 |
| 3,392,607 | 7/1968 | Gieseke | 408/115 |
| 3,465,620 | 9/1969 | Hilburn | 408/115 |
| 3,500,884 | 3/1970 | Hand et al. | 408/95 X |

*Primary Examiner*—Z. R. Bilinsky
*Attorney, Agent, or Firm*—Thomas Schneck

[57] ABSTRACT

A jig for guiding the bits of boring and routing tools to predetermined locations on a door in preparation for the installation of a door knob assembly, dead bolt or the like. The apparatus includes an elongated channel-shaped frame member for receiving an edge of a door and having a base portion and two depending side portions, a pair of templates attached to respective side portions of the channel shaped frame member for guiding a boring tool bit to locations along the side of the door, a movable edge boring guide attached over the base portion of the frame for directing a boring tool to predetermined locations along the edge of the door, and a pair of clamps for clamping the frame firmly to the door. The base portion of the frame forms a router support surface to facilitate routing of the edge of the door.

6 Claims, 8 Drawing Figures

BORING AND ROUTING JIG FOR CYLINDRICAL DOOR KNOB ASSEMBLIES AND THE LIKE

BACKGROUND OF THE INVENTION a. Field of the Invention

The invention relates generally to jigs for guiding the bits of drills, routers and the like to locations on a work surface, and more particularly to jigs specifically designed to facilitate in the boring and routing of a door in preparation for the installation of a door knob assembly or the like.

b. Prior Art

To install a door knob assembly or dead-bolt lock in a new door it is necessary to first prepare the door by boring and routing holes and recesses receptive to the assembly. The holes must be aligned with respect to each other in a predetermined manner and within certain tolerances so that the mass-produced lock assembly will correctly fit into the door.

For instance, for the most common type of door knob assembly, a bore is formed into the side edge of a door for receiving a latch bolt, and a second bore is formed between two opposing sides of the door to receive a bolt retracting mechanism, such as a key or knob. If the first and second bores are not properly aligned the door knob assembly will not fit therein, which often means that an expensive door must be replaced or reworked. Furthermore, even if the lock assembly can be fitted into the bores, if the bores were not formed accurately the assembly may bind or improperly latch, resulting in unsatisfactory performance.

Another material removal step necessary for the installation of a standard door knob assembly is the routing of the edge of the door around the latch bolt bore for the installation of an edge plate. The edge plate must reside in such a routed depression so that it does not strike the door jamb when the door is closed.

For a person to hand craft the various bores and depressions as described above, he or she would require a great deal of experience and skill. Because of this fact, various persons have developed prior art devices to aid in the preparation of the various bores and routed depressions that are necessary for the installation of a door knob assembly. One example of a prior boring and routing jig for doors is disclosed in U.S. Pat. No. 3,392,607 of E. Gieseke which teaches a jig having a pair of boring guide plates clamped to opposite sides of a door and hinged members for guiding the bits of boring tools or routers to the edge of the door.

In U.S. Pat. No. 3,700,344, A. T. Grumbach discloses a mortising device comprising a frame positionable over the edge of a door and a carriage slideably mounted to the frame. The carriage guides a drill to a series of vertically related positions along the edge of the door to mortise a vertical slot shape for receiving the door latch of a locking mechanism.

These and other jigs found in the prior art are relatively special purpose tools. For instance, some jigs of the prior art include template members which are semi-permanently attached to the jig by a plurality of assembly screws. It would be very difficult to use such jigs for an unusual or nonstandard door knob assembly. Other jigs can only be used to mortise holes in the edges of doors and are not adapted to guide boring tools into the sides of doors.

SUMMARY OF THE INVENTION

An object of the invention is to provide a tool for guiding a boring or routing tool bit into a door in order to form the various bores and recesses required for the installation of a door knob assembly and the like. Another object of the invention is to provide a guide for tool bits to form the bores and recesses necessary for many different types of door knobs and bolt assemblies. Yet a further object of the invention is to provide the above mentioned objectives with a tool that is economical to produce and which is still strong and rugged.

Briefly, the boring and routing jig of the present invention includes an elongated channel-shaped frame for receiving an edge of a door, with the frame having an apertured base portion and two depending, apertured side portions. A first elongated side template, provided with at least one guide hole for guiding the bit of a boring tool, is attached to the frame so as to align the guide hole with an aperture of one of the side portions and a second elongated side template is provided, also having at least one guide hole for guiding the bit of a boring tool, the second side template being attached to the frame, opposite the first side template and generally parallel thereto, so as to align the boring guide hole with the aperture of the other side portion for mounting of door knobs and the like. A removable edge boring guide is attached to the frame so as to align a drill guiding aperture in the edge boring guide with the aperture of the base portion of the frame for a bolt or latch tongue to be mounted in the door for edgewise movement out of the door and into a door jamb striker plate of a frame which may house the door. Means for clamping the frame of the routing jig to the door are mounted at the sides of the channel.

The side templates are removably secured in place for substitution by other templates defining different size and shape holes. The apertured base portion of the frame may itself be a removable edge template or support a removable template edge to be used for guiding a router when the edge boring guide has been removed. Like the side templates, the edge template may be changed to select other templates defining selected edge apertures.

These and other objects and advantages of the present invention will become apparent upon reading the following detailed description as accompanied by the several figures of the drawings.

DESCRIPTION OF THE PREFERRED EMBODIMENT

Figure 1:
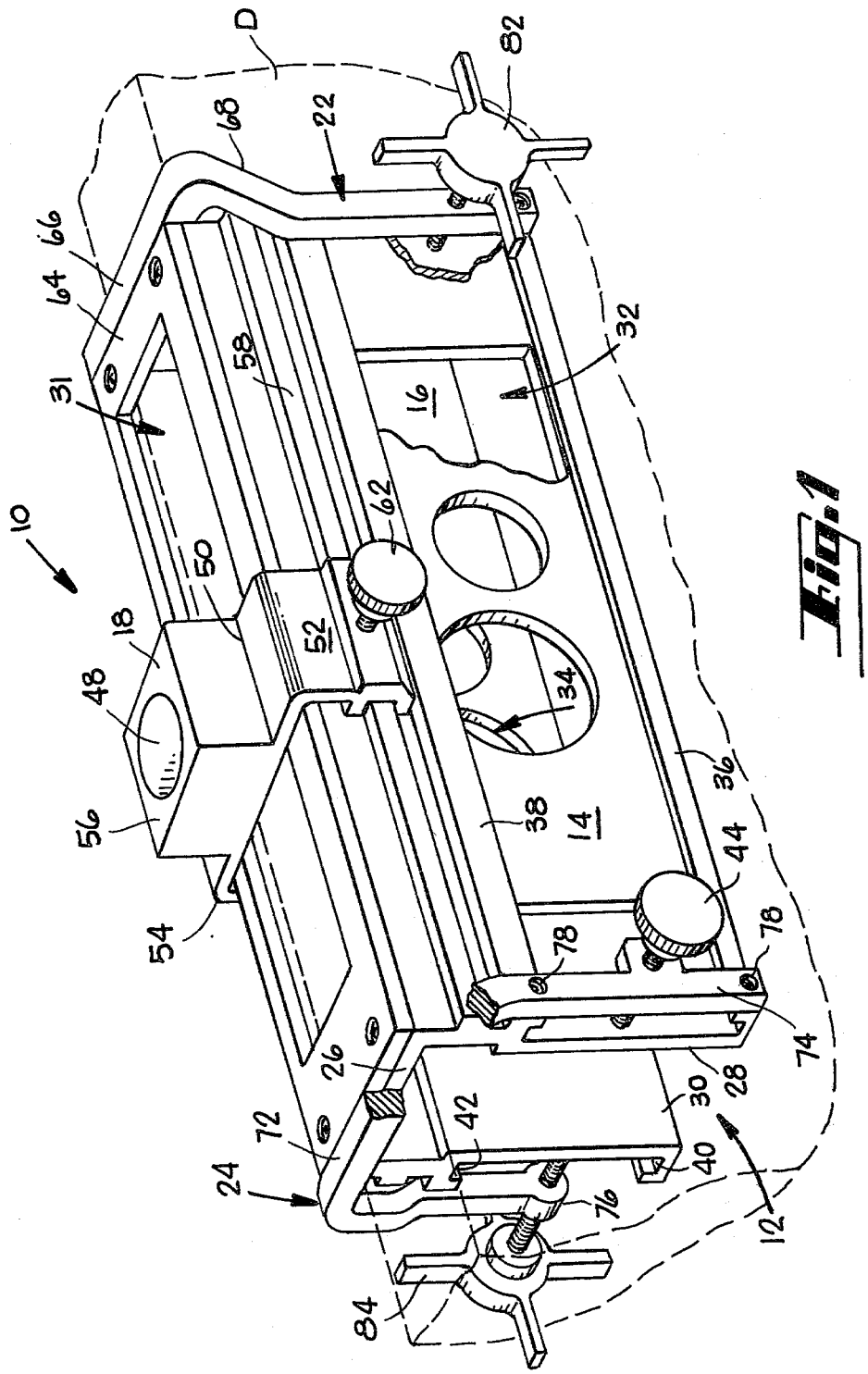
FIG. 1 is a perspective view of a boring and routing jig for doors in accordance with the present invention.

Referring to FIG. 1, boring and routing jig 10 includes an elongated channel-shaped frame member 12, a first side template 14, a second side template 16, a movable edge boring guide 18, and means for clamping the frame member of the jig to a door D including a first C-clamp 22 and a second C-clamp 24.

The channel-shaped frame member 12 of the present invention includes a base portion 26 and a pair of depending side portions 28 and 30. In cross section, the frame member is substantially C-shaped and is slightly wider proximate to the base portion than it is proximate to the terminal ends of the side portions. Frame member 12 is preferably an aluminum extrusion, although other fabrication techniques may be employed. The separation between side portions 28 and 30 near their terminal ends is slightly greater than the width of a standard door, or approximately one and three quarter inches. The widened area between the side portions proximate to base portion of the frame is provided so that the frame member, when clamped to the door, will not damage the edges of the door, yet the narrowed area will permit firm clamping.

Side portion 28 and side portion 30 are provided with elongated apertures 32 and 34, respectively. Side portion 28 is provided with a means for attaching template 14 to the frame including a pair of lip portions 36 and 38 which act as opposed rails between which side template 14 may slide. Similarly, side portion 30 is provided with a pair of lips 40 and 42 which also act as opposed rails between which template 16 may slide. Side template 14 is retained in a desired position between lips 36 and 38 of the frame by a thumb screw 44 which, when screwed inwardly, may engage one of several small recesses or detents formed near an edge of the template for alignment purposes. Template 16 is held on the other base portion of the frame in a similar fashion by a thumb screw 46 (not shown in this figure).

By attaching the templates to the frame in this manner they can be quickly and easily removed by simply unloosening respective thumb screws 44 and 46 and sliding the template out from between the retaining lips. Furthermore, even when the jig of the present invention is attached to the door, new templates with different size and shape holes may be substituted for the old ones should they be required. Also, by providing a plurality of recesses along the side templates that the ends of screws 44 and 46 can engage, the side templates can be quickly indexed or aligned into several positions, for reasons to be explained later.

Side templates 14 and 16 are rigid, elongated plates of a suitably rugged material such as aluminum. They can be provided with any number of apertures along their length for guiding the bit of a boring tool to various locations on the side of a door. The holes of side templates 14 and 16 can align with each other to allow unrestricted drilling through the door.

Base 26 defines a large, elongated central hole therethrough, but has solid peripheral regions for supporting removable edge template 64. The edge template 64 is used for guiding a router for mounting special door hardware such as plates which fit into the edge of a door. Since different doors may require different size plates, appropriate routing templates are to be provided for removable mounting on base 26, such as by screws.

Edge boring guide 18 includes a drill guiding aperture 48 which retains a self-feeding drill that is to be discussed subsequently. The edge boring guide 18 preferably is a short, track-riding member having a widened base portion 50 and two depending side portions 52 and 54. Drill guiding aperture 48 is formed through the widened base portion 50. The side portions of the boring guide 18 are disposed over the side portions of the frame 12 so that aperture 48 may be aligned with a desired location in the base 26 of the frame member.

Terminal parts of the side portions of boring guide 18 form elongated track following grooves to engage with a pair of tracks including a first track 58 and a second track 60 (not seen in this figure). As can be seen in this figure, track 58 extends longitudinally along side portion 28 for approximately the entire length of the frame member. Track 60, which is not seen, similarly extends along the other side portion of the frame. The track following grooves of the side portions of the edge boring guide engage the tracks to slideably attach the boring guide to the frame. A thumb screw 62 is provided to fix the position of the boring guide along the tracks. When screw 62 is tightened, an end thereof engages track 58 to provide a clamping action.

With the boring guide moved to one side of the jig, a router may be disposed against the base portion 26 of the frame member 12 or preferably on an edge template 64 on top of the base so that a routing bit extends through aperture 31 to contact the edge of door D, indicated by phantom lines. In this preferred embodiment, an edge template 64 has an aperture therein the size and shape as aperture 30 in the base portion 26 of the frame member 12. Edge template 64 provides a flat, smooth and trued surface for extremely accurate routing of the edge of the door to accommodate door plates and the like.

C-clamps 22 and 24 are disposed around opposite ends of frame member 12. C-clamp 22 includes a base portion 66 and a pair of depending leg portions including a leg portion 68 and a leg portion 70 (not seen in this figure). C-clamp 24 is a mirror image of clamp 22 in that it includes a base portion 72 and a pair of depending leg portions 74 and 65.

Leg portion 74 is attached to side portion 28 of the frame by a pair of machine screws 78. In a similar manner, leg portion 76 is attached to side portion 30 of the frame by a pair of screws 80 (not seen). Disposed through threaded apertures formed through leg portions 68 and 76 are clamping bolts 82 and 84, respectively. It will be noted that in this preferred embodiment, leg portions 70 and 76 are slightly shorter than respective leg portions 68 and 74. This is so that when the clamping bolts are tightened the ends of the bolts contact the center of the side edge portion of the frame member to force those slightly resilient members against door 20, and thus firmly clamp the jig to the door.

Figure 2:
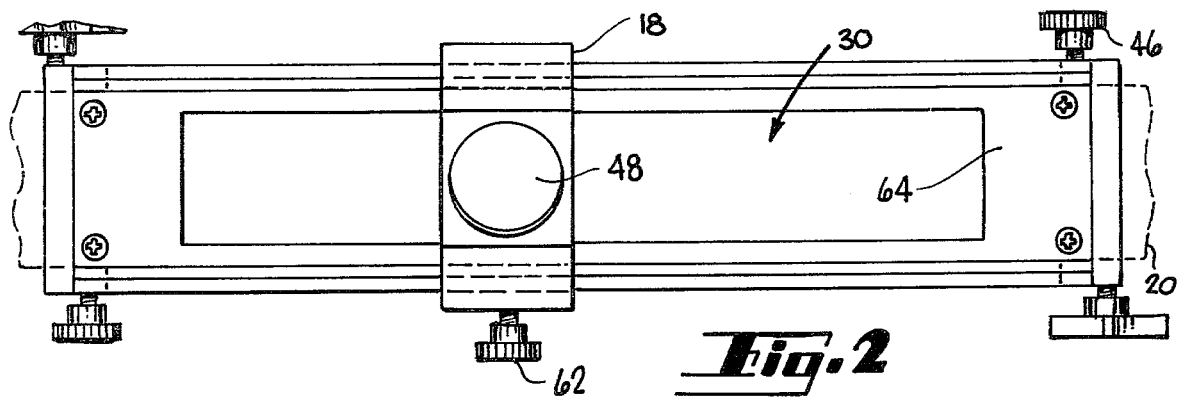
FIG. 2 is a partial top view of the jig shown in FIG. 1.

In the top plan view of the jig shown in FIG. 2 the arrangement of edge boring guide 18 over removable edge template 64 is more clearly seen. The edge boring guide may be located along the tracks of the frame member at virtually any position and retained thereat by thumb screw 62. A boring tool is then guided by drill guiding aperture 48 through aperture 31 and into the edge of door 20. Seen for the first time in the figure is thumb screw 46 which retains template 16 in place between lips 40 and 42.

Figure 3:
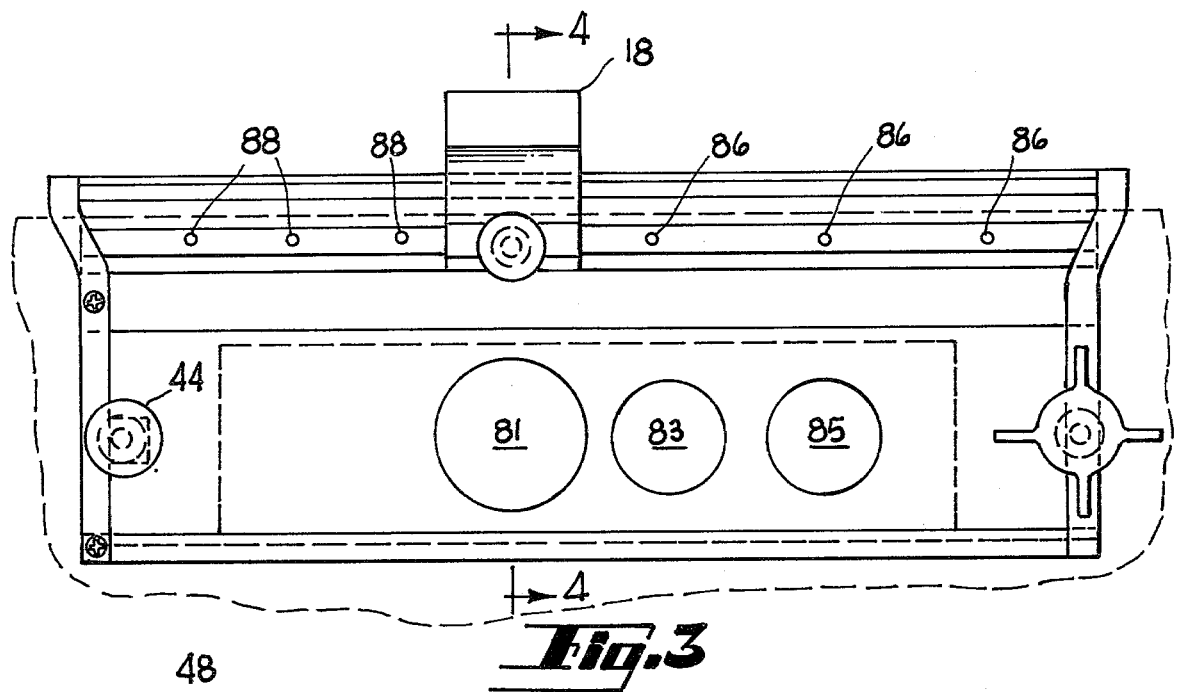
FIG. 3 is a partial side elevational view of the jig shown in FIG. 1.

Referring now to FIG. 3, a side elevational view of the boring and routing jig is shown with a side template 14 having three apertures 81, 83 and 85. This particular template is often used for installing a door knob assembly and an associated dead bolt assembly directly above it. For this purpose, the large aperture 81 to the left of the figure is used to guide a circular boring tool bit to a first location on the side of a door for the door knob assembly and then either one of the two smaller apertures 83 or 85 is used to locate the dead bolt assembly directly above it. Edge boring guide 18 can then be positioned to provide a latch bolt hole for both the door knob and the dead bolt assemblies. To facilitate the positioning of the edge boring guide above the appropriate apertures on the template a plurality of recesses such as recesses 86 and 88 may be formed into the surface of track 58 so that the end of thumbscrew 62 may engage with them in a detent-like fashion. Likewise, as mentioned earlier, template 14 may be provided with a plurality of recesses that the end of thumb screw 44 may engage with. Thus, by utilizing the detent capabilities of the jig, the various apertures to be formed in the door can be quickly aligned in a highly accurate manner.

Figure 4:
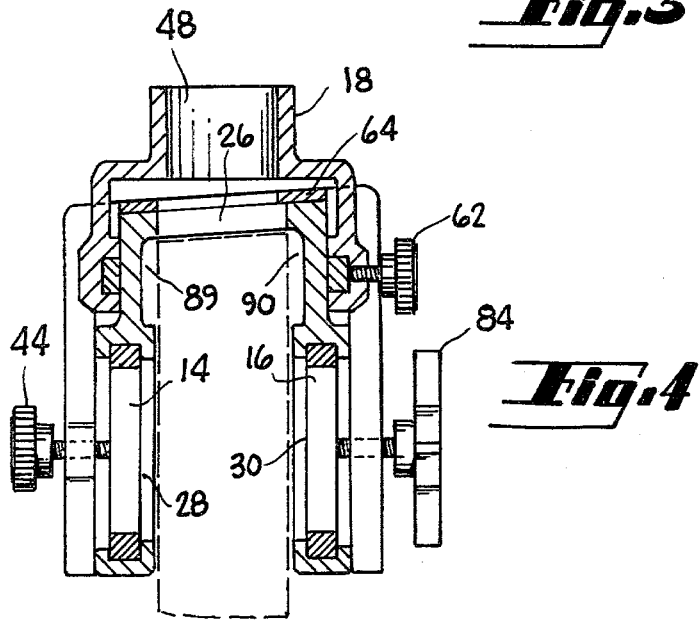
FIG. 4 is a cross-sectional view taken along lines 4—4 of FIG. 3.

In FIG. 4, which is a cross sectional view taken along line 4—4 of FIG. 3, the angular interrelationships of the portions of the frame member of the jig may be more clearly seen. Clearly visible are the aforementioned space 89 and 90 between the frame member and door 20 and the angular relationship between the base portion 26 of the frame and the two side portions 28 and 30. As mentioned earlier, in this preferred embodiment the base portion is not at exactly right angles with respect to the two side portions of the frame member but rather follows the angular bevel of the edge of a standard door. Since the two sides of the frame are substantially parallel, this means that base portion 26 forms an internal angle slightly greater than 90° with respect to side portion 28 and an internal angle slightly less than 90° with side portion 30. Because the average door edge bevels one sixteenth of an inch per inch of door width, which works out to an angle of 3°5', the angle between side portion 30 and the base should be approximately 93° and the angle between base portion 26 and side 28 should be approximately 87°.

While it is decidedly advantageous to have base portion 26 follow the bevel of the edge of the door, it would not be appropriate for any bores drilled into the edge of the door to be angled with respect to the sides of the doors. For this reason, the thickened base portion of edge boring guide 18 does not follow the bevel of the frame member. In other words, the axis of drill guiding aperture 48 is substantially parallel to side members 28 and 30 and thus to the sides of door 20.

Figure 5:
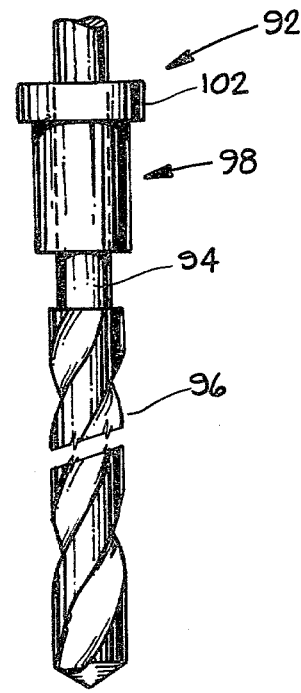
FIG. 5 is an elevational view of a self-feeding drill for use with the jig of the present invention.

In FIG. 5, a self feeding drill 92 for use in conjunction with the boring guide 18 of the present invention is shown. The self feeding drill comprises a shaft 94, a boring bit 96 and a sleeve 98 having a substantially cylindrical lower portion 100 and a flanged upper portion 102. In use, cylindrical portion 100 is disposed within drill guiding aperture 48 so that flange 102 rests against the upper surface of the base portion of boring guide 18. A means for imparting rotational force, such as an electric drill, is attached to an end of shaft 94 opposite from boring bit 96. Bit 96 is then placed against the edge of the door and the drill is actuated to cause the boring bit to create a bore into the edge of the door. The process as described above is illustrated in FIGS. 6 and 7.

Figure 6:
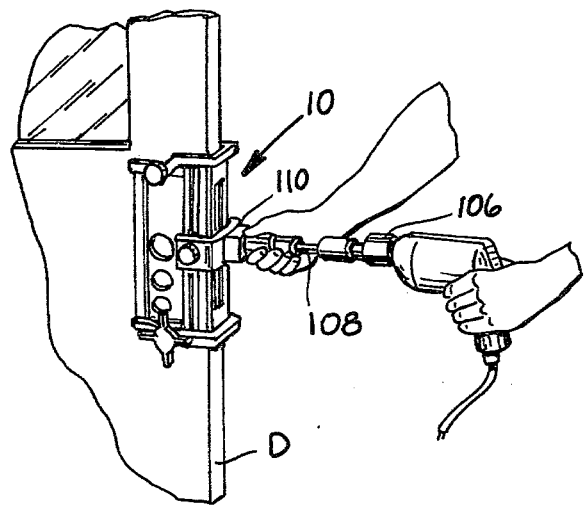
FIGS. 6 and 7 illustrate use of the jig of the present invention.
Figure 7:
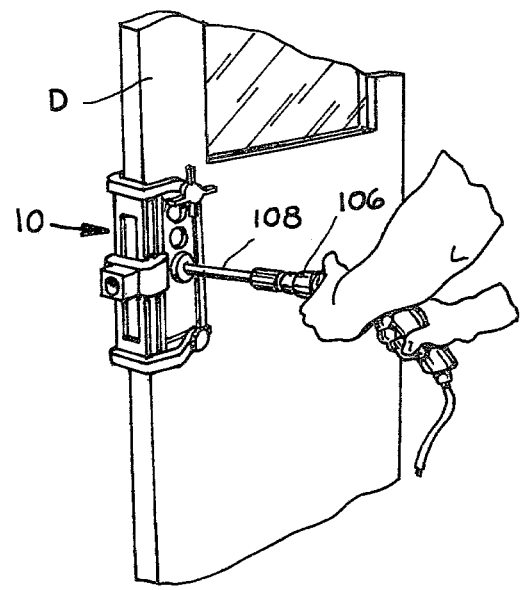

In FIGS. 6 and 7, the method for using the jig of the present invention for forming bores through the sides of the door is shown. In these figures, a man is seen holding an electric drill 106 to which a boring tool 108 is attached. In FIG. 6, a hole is being drilled with the aid of a movable boring guide 110. In FIG. 7, the bit of the boring tool is disposed through one of the three apertures of the template and a bore is quickly and easily formed into the door D.

Figure 8:
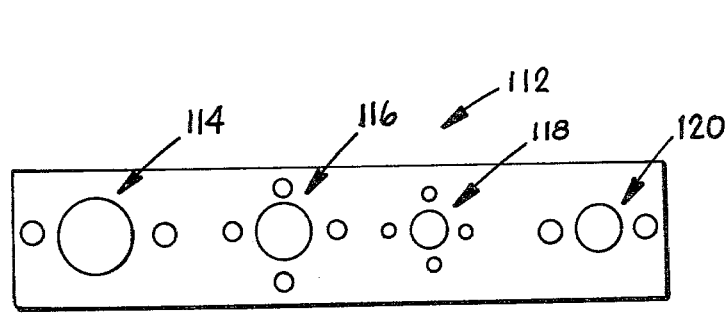
FIG. 8 is a frontal view of a template for use in the jig of FIG. 1.

With reference to FIG. 8, a template 112 suitable for mortise locks is shown. The template has four sets of hole patterns 114, 116, 118 and 120, which correspond to the most frequently used patterns. On the other hand, the hole patterns in the template 14 of FIG. 1 are for cylindrical locks. An advantage of the present invention is that templates may be removed from the jig and new templates with desired hole patterns may be inserted. At the same time, a cooperative boring guide with allow drilling holes into a door edge so that the edge hole and template holes will have a desired relation for accommodating a variety of door locks.

What is claimed is:

1. A boring and routing jig for guiding tool bits to locations upon a door, the jig comprising:
   an elongated, channel shaped frame member for receiving an edge of a door, the frame member including a base portion defining an aperture therein and first and second parallel, spaced apart, depending side portions, where each of said portions is provided with an elongated aperture therein,
   a first elongated side template means, adjacent to a first side portion, removable and adjustable with the frame member in place and having a plurality of holes defined therein for guiding a boring tool bit;
   a second elongated side template means, adjacent to a second side portion, removable and adjustable with the frame member in place and having a plurality of holes defined therein for guiding a boring tool bit;
   pairs of template guides associated with said first and second side portions, each template guide having a first lip means formed along the length of a side portion, and a second lip means formed along the length of the same side portion, said second lip means being substantially parallel to and facing said first lip means and separated from said first lip means by substantially the width of a corresponding template means, whereby said corresponding template means may be slideably disposed between said first and second lip means,
   a movable edge boring guide means defining a drill guiding aperture mounted for motion adjacent to the base portion of the frame member for drill communication through the aperture in the base portion at a desired location, and
   means for clamping side portions of said frame member to said door,
   whereby when said frame member is clamped to a door, the holes of said first side template means may guide a boring tool bit to a first location on a first side of the door, the holes of said second template means may guide a boring tool bit to a second location on a second side of the door, and said edge boring guide means guides a drill bit to a third location along an edge of the door, where said first, second and third locations are aligned in a predetermined relationship.

2. A boring and routing jig as recited in claim 1 further comprising:
   a flat door edge template removably mounted on the base portion of the frame member beneath said edge boring guide and provided with an elongated aperture therein, whereby when said removable boring guide is removed from said frame member a router may be supported against said flat door edge template.

3. A boring and routing jig as recited in claim 1 wherein said means for clamping said frame member to said door comprises, at least one C shaped bracket straddling said frame member and having a base portion and first and second depending leg portions, where a first leg portion is provided with a threaded bore, and a bolt means engaging said threaded bore and extending toward said frame member and said second leg portion, whereby tightening said bolt means exerts compressive force on said frame member.

4. A boring and routing jig as recited in claim 1 wherein said edge boring guide includes a short channel member having a thickened base portion through which is formed said drill guiding aperture, and a pair of depending side portions each provided with a track following groove.

5. A boring and routing jig as recited in claim 4 wherein said channel shaped frame member has track means movably mounting said edge boring guide on the base of said frame member comprising,
   a first track extending partially along the length of said first side portion of said frame, a second track extending partially along the length of said second side portion of said frame, said first and second tracks spaced to mate with said track following grooves,
   and means for retaining said boring guide in position along said tracks.

6. A boring and routing jig as recited in claim 5 wherein said means for retaining said boring guide in position along said tracks includes,
   a bolt means screwed into a threaded bolt hole formed through one of said depending side portions of said edge boring guide,
   whereby when said bolt means is tightened, an end thereof contacts said frame member to retain said boring guide in position.

* * * * *